United States Patent
Lin

(10) Patent No.: US 9,523,904 B2
(45) Date of Patent: Dec. 20, 2016

(54) LIGHT COVER WITH X-SHAPED STRUCTURE

(71) Applicant: Chien-Ting Lin, Santa Fe Springs, CA (US)

(72) Inventor: Chien-Ting Lin, Santa Fe Springs, CA (US)

(*) Notice: Subject to any disclaimer, the term of this patent is extended or adjusted under 35 U.S.C. 154(b) by 0 days.

(21) Appl. No.: 14/870,382

(22) Filed: Sep. 30, 2015

(65) Prior Publication Data

US 2016/0018079 A1  Jan. 21, 2016

Related U.S. Application Data

(63) Continuation-in-part of application No. 14/108,695, filed on Dec. 17, 2013, now abandoned.

(51) Int. Cl.
  *G03B 15/06* (2006.01)
  *F21V 1/06* (2006.01)
  *A45B 19/00* (2006.01)

(52) U.S. Cl.
  CPC ............ *G03B 15/06* (2013.01); *F21V 1/06* (2013.01); *A45B 2019/001* (2013.01)

(58) Field of Classification Search
  CPC ..... A45B 19/00; A45B 2019/001; F21V 1/06; G03B 15/06
  See application file for complete search history.

(56) References Cited

U.S. PATENT DOCUMENTS

2008/0000513 A1  1/2008 Yul et al.

FOREIGN PATENT DOCUMENTS

| GB | EP 0947877 A1 * | 10/1999 | ............... F21V 7/18 |
| IT | WO 2013098678 A1 * | 7/2013 | ............. G03B 15/06 |

* cited by examiner

*Primary Examiner* — Karabi Guharay
*Assistant Examiner* — Nathaniel Lee
(74) *Attorney, Agent, or Firm* — Lin & Associates Intellectual Property, Inc.

(57) ABSTRACT

A lighting assembly used in photographing or video recording has a light cover with X-shaped structure, which includes a main body and two elastic supporting rods. The main body has a light holder fitting opening at a center thereof. The two elastic supporting rods are fixed along four edges of the main body in such a way that they cross each other at the center thereof at the light holder fitting opening. The light cover can be folded from a tent-like form to an easy-to-carry flattened form.

11 Claims, 6 Drawing Sheets

LIGHT COVER WITH X-SHAPED STRUCTURE

CROSS REFERENCE

This is a continuation-in-part of U.S. application Ser. No. 14/108,695, filed on Dec. 17, 2013, which is incorporated herewith by reference.

BACKGROUND OF THE INVENTION

1. Field of the Invention

The present invention relates to a lighting assembly used in photographing and video recording. The present invention is a light cover with X-shaped structure, more particularly, is a light cover with two elastic supporting rods which intersect with each at the center thereof. The light cover of the present invention can be folded from a tent-like form into an easy-to-carry flattened form.

2. The Prior Arts

The conventional light cover used in photographing is usually assembled with the lighting device via fasteners, latches, or other jointing structures. However, these assembling methods can be rather time consuming and thereby causing inconvenience during the assembling and disassembling processing. Therefore, the greatest disadvantage of the conventional light covers is the difficult and time-consuming assembling process.

The light covers with latches are usually accommodated with fast folding structures. However, during the assembling process, the supporting rods need to be engaged with certain grooves after the light holders are assembled with the base of the light cover. The process of engaging the supporting rods with certain grooves can also be very time-consuming and requires lots of efforts, thereby making the assembling process of the light cover inconvenient.

Another type of conventional light cover is directly placed over the light holder. This type of conventional light cover is rather unstable and can easily fall off due to external force.

Different types of conventional light covers have their own advantages and disadvantages. For example, some light covers are easier to assemble, but can be rather unstable in term of its structure. Some light covers are easy to disassemble, but are very difficult and time-consuming to assemble. In addition, there are other types of light covers which are very stable in terms of its structure, but are very time-consuming in its assembling and disassembling process.

U.S. Publication No. 2008/0000513 (hereinafter Yul) discloses a collapsible frame assembly 34 that includes a plurality of collapsible poles or frame members 42 coupled to a ridge hub 44. As shown in all the figures of Yul, the collapsible frame assembly includes at least four frame members 42 respectively coupled to four receiving sockets of the ridge hub 44. It should be noted that in Yul one end of each frame member is received in the receiving socket and none of the frame members cross each other. Consequently, the installation in Yul is very complicated and time-consuming.

Also, the frame members of Yul never cross each other and one end of each frame member in Yul is received in the receiving socket of the ridge hub. In other words, two ends of each frame member in Yul are not fixed respectively to two opposite edges of the tent cloth. Furthermore, the structure of Yul requires at least four frame members.

SUMMARY OF THE INVENTION

Based on the above reasons, a primary objective of the present invention is to provide a light cover with X-shaped structure which can be pushed into a flattened form and can quickly return to a tent-like form.

Another objective of the present invention is to be able to reduce the size of the light cover for easy storage and transportation.

In order to fulfill the above objectives, a light cover with X-shaped structure is provided in the present invention. The light cover with X-shaped structure includes a main body and two elastic supporting rods. The main body is a rectangular and tent-like cloth having a light holder fitting opening at a center thereof. The two and only two elastic supporting rods are fixed along four edges of the cloth. With two ends of each elastic supporting rod is respectively fixed to two opposite edges of said four edges so that the two elastic supporting rods cross each other at the center thereof at the light holder fitting opening. The light cover is supported by the two elastic supporting rods to form a tent-like form. When the two elastic supporting rods are pushed in two predetermined directions respectively, the light cover is folded to form a flattened form.

The present invention is characterized in that the two elastic supporting rods cross each other at the center thereof at the light holder fitting opening. The two elastic supporting rods are fixed along the four edges of the main body, so the light cover is supported by the two elastic supporting rods and forms a tent-like form. When the two adjacent supporting rods are pushed in two directions respectively, the light cover is folded into a flattened form. Due to the elasticity of the two elastic supporting rods, the light cover provided by the present invention is able to return to the tent-like form quickly from the flattened form.

Comparing with the conventional light cover, the present invention is easier to assemble/disassemble, and the process of the assembling/disassembling is also much less time-consuming. In addition, the present invention is also much easier to stow. In short, the present invention has better mobility and applicability compared with the conventional light covers.

According to an embodiment of the present invention, the two elastic supporting rods can also be made of flexible materials. In such case, the light cover can be further folded from the flattened form into a compact form. With the elasticity of the two elastic supporting rods, the light cover can quickly return from the compact form to the tent-like form. In this way, the light cover is even more convenient to use.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENTS

The accompanying drawings are included to provide a further understanding of the invention, and are incorporated in and constitute a part of this specification. The drawings illustrate embodiments of the invention and, together with the description, serve to explain the principles of the invention.

Figure 1:
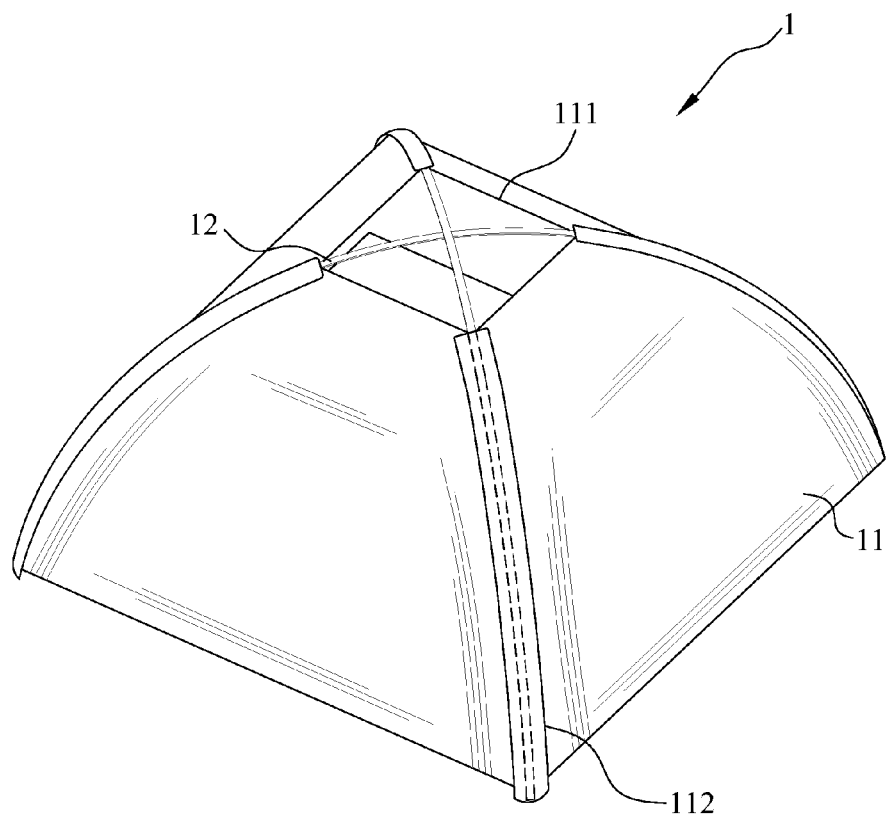
FIG. 1 is a perspective view showing a light cover with X-shaped structure according to the present invention.

FIG. 1 is a perspective view showing the light cover 1 with X-shaped structure of the present invention. As shown in FIG. 1, the light cover 1 with X-shaped structure of the present invention includes a main body 11 and two elastic supporting rods 12. The main body 11 is a rectangular and tent-like cloth having a light holder fitting opening 111 at the center thereof. Preferably, the main body 11 is a square and tent-like cloth, as shown in FIG. 1. The two elastic supporting rods 12 are fixed along four edges of the main body 11 in such a way that the two elastic supporting rods cross each other at the center thereof at the light holder fitting opening 111. The light cover 1 is supported by the two elastic supporting rods 12 to form a tent-like form. When folding the light cover 1, the two elastic supporting rods 12 are pushed in two predetermined directions respectively, the light cover 1 is folded to form a flattened form (not shown in FIG. 1). With the elasticity of the two elastic supporting rods 12, the light cover 1 with X-shaped structure is able to return from the flattened form to the tent-like form (not shown in FIG. 1).

As shown in FIG. 1, the light cover 1 with X-shaped structure has an overall shape of a square tent, and the two elastic supporting rods 12 cross each other. FIG. 1 is only a schematic drawing of the light cover 1. In FIG. 1, four elastic supporting rod fitting pockets 112 are disposed on the main body 11 of the light cover 1 in a symmetrical manner, and the two elastic supporting rods 12 are fitted respectively in the four elastic supporting rod fitting pockets 112 in such a way that the two elastic supporting rods 12 cross each other. The four elastic supporting rod fitting pockets 112 are disposed in pair along the four edges of the main body 11, and are disposed in a symmetrical manner on the main body 11. The two ends of each of the elastic supporting rod 12 are fitted in two corresponding elastic supporting rod fitting pockets 112, so the two elastic supporting rods 12 cross each other at the light holder fitting opening 11.

Figure 2:
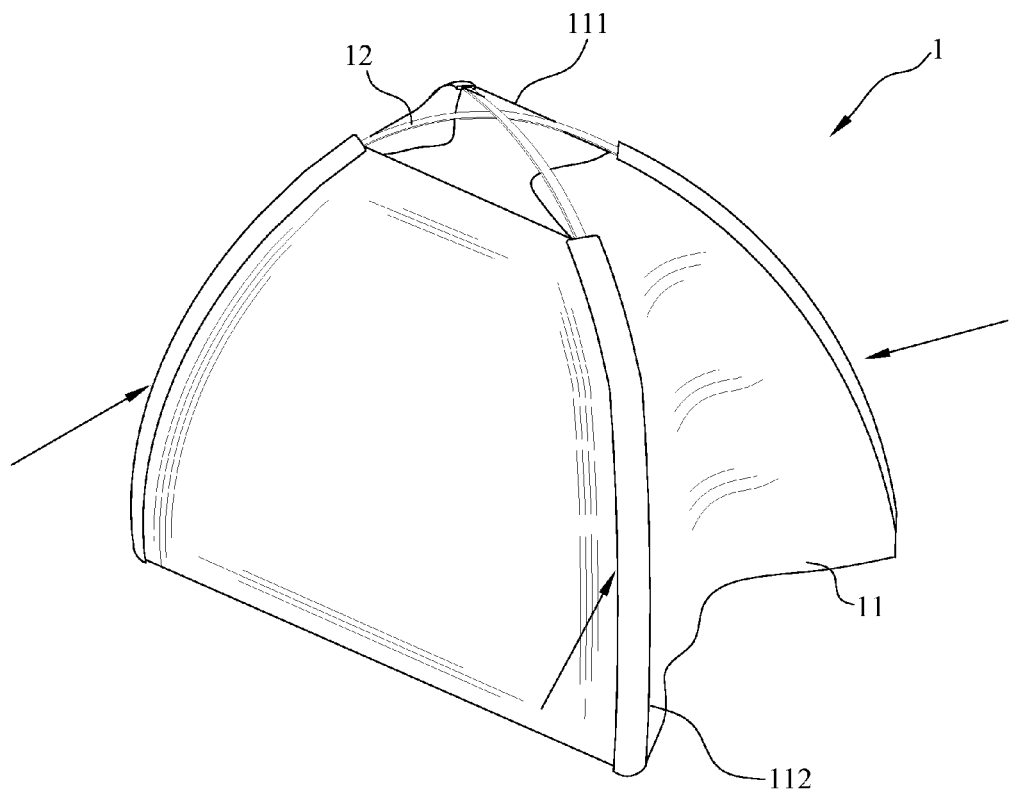
FIG. 2 is a schematic view illustrating the folding process of the light cover with X-shaped structure according to the present invention.
Figure 3:
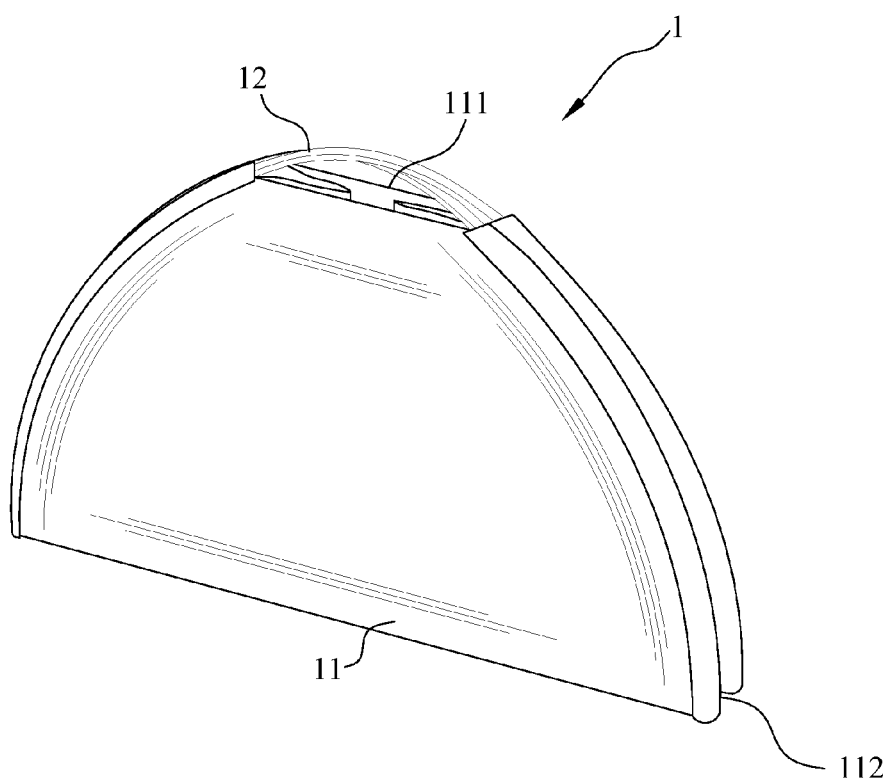
FIG. 3 is a perspective view showing a flattened form of the light cover with X-shaped structure according to the present invention.

FIG. 2 is a schematic view illustrating the folding process of the light cover 1 with X-shaped structure according to the present invention. As shown in FIG. 2, the light cover 1 with X-shaped structure is shaped like a tent. The two elastic supporting rods 12 are pushed in two predetermined directions respectively as indicated by the arrows in FIG. 2, so as to fold the light cover 1 into a flattened form (as shown in FIG. 3). In this way, not only the light cover 1 is easier to carry and stow, but it can also be quickly returned to the tent-like form as shown in FIG. 1. Because the two elastic supporting rods 12 of the light cover 1 are fixed on the main body 11 crossing each other, the light cover 1 can easily return from the flattened form to the tent-like form with the elasticity of the two elastic supporting rods 12.

FIG. 3 is a perspective view showing a flattened form of the light cover 1 with X-shaped structure of the present invention. As shown in FIG. 3, after the two elastic supporting rods 12 are pushed in two predetermined directions respectively as explained above, the light cover 1 is quickly folded into the flattened form. Due to the elasticity of the two elastic supporting rods 12, the light cover 1 can be folded or unfolded quickly without much effort needed. The light cover 1 of the present invention is also able to return from the flattened form to the tent-like form quickly with the elasticity of the two elastic supporting rods 12.

Figure 4:
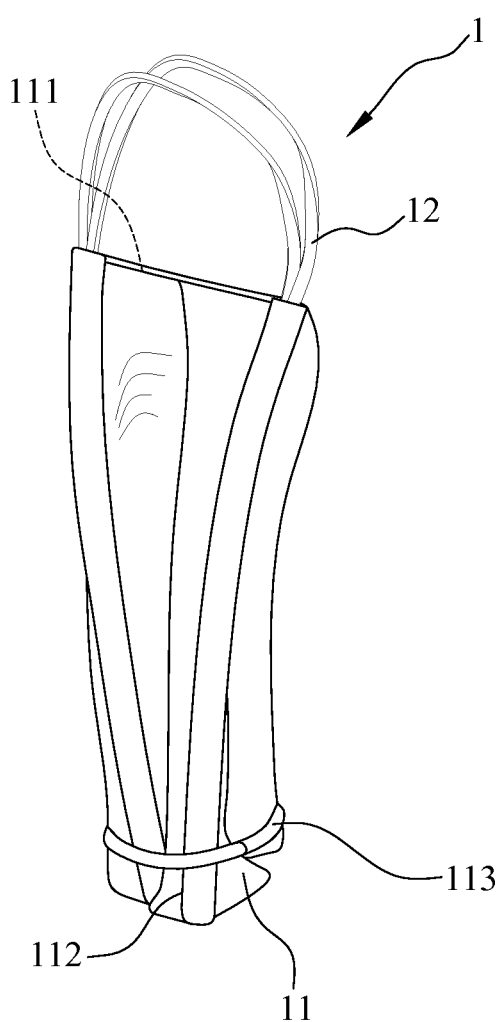
FIG. 4 is a perspective view showing a first embodiment of the light cover with X-shaped structure according to the present invention.

FIG. 4 is a perspective view showing a first embodiment of the light cover 1 with X-shaped structure according the present invention. As shown in FIG. 4, the elastic supporting rods 12 are made of flexible materials. A storage mechanism 113 is disposed on a surface of the main body 11. When the light cover 1 is in the flattened form, the storage mechanism 113 is able to fasten and tighten the two ends of the two elastic supporting rods 12 by tying around the ends thereof. In this way, the light cover 1 is further folded from the flattened form into a compact form.

When the light cover 1 is further folded into a compact form by the storage mechanism 113, it is also more adapted to be carried around by the users. The elastic supporting rods 12 exposed at the light holder fitting opening 111 can be utilized as a handle for the users to grab on. When the storage mechanism 113 of the light cover 1 is released, the light cover then returns from the compact form to the tent-like form by the elasticity of the two elastic supporting rods 12.

Figure 5:
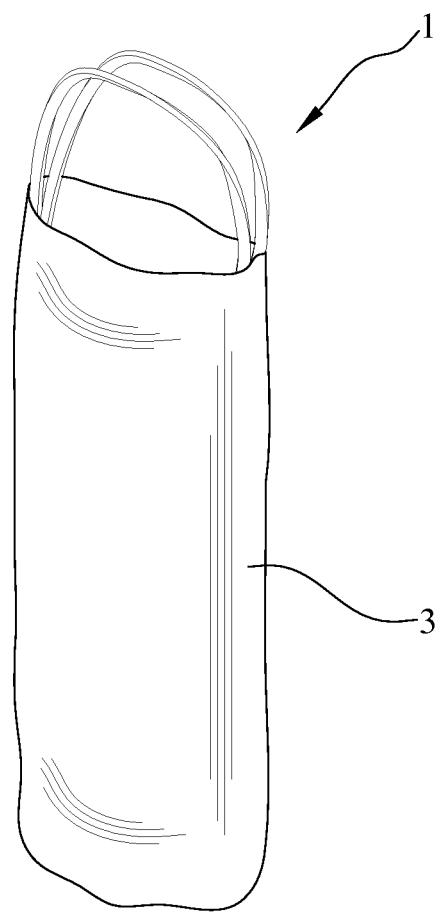
FIG. 5 is a perspective view showing a second embodiment of the light cover with X-shaped structure according to the present invention.

FIG. 5 is a perspective view showing a second embodiment of the light cover 1 with X-shaped structure according to the present invention. As shown in FIG. 5, the elastic supporting rods are made of flexible materials, and the light cover 1 with X-shaped structure can be folded from the flattened form into the compact form. When the light cover 1 is folded into the compact form, it can be placed into a storage bag 3. The storage bag 3 serves as a protection of the light cover 1 which protects the light cover 1 from scratches and dusts, thereby improving the durability of the light cover 1.

When the light cover 1 is taken out tom the storage bag 3, it is able to return from the compact form to the tent-like form with the elasticity of the two elastic supporting rods 12.

Figure 6:
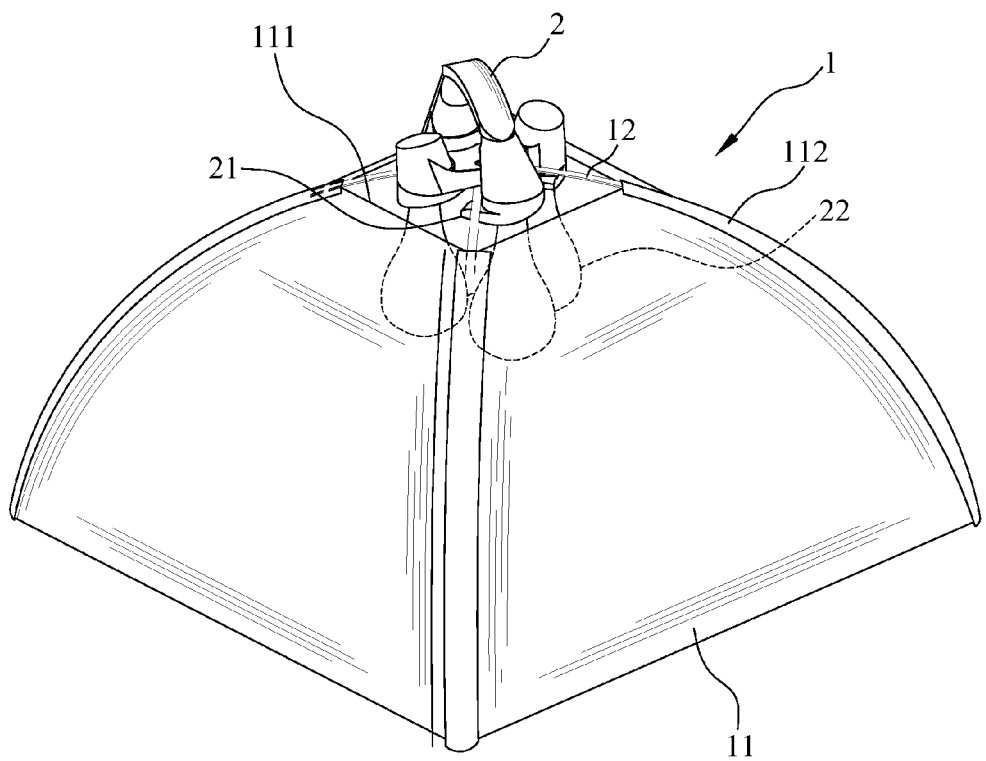
FIG. 6 is a perspective view showing a third embodiment of the light cover with X-shaped structure according to the present invention.

FIG. 6 is a perspective view showing a third embodiment of the light cover 1 with X-shaped structure according to the present invention. As shown in FIG. 6, the light cover 1 with X-shaped structure is assembled with a light holder 2. The light holder 2 includes multiple hook members 21 and at least one light-emitting unit 22. The hook members 21 are engaged with the two elastic supporting rods 12, and the at least one light-emitting unit 22 is disposed at the light holder fitting opening 111. The light-emitting units 22 are disposed in such a way that they pass through the light holder fitting opening 111, and are located between any two adjacent elastic supporting rods 12.

As shown in FIG. 6, the light holder 2 can be installed by first passing the light-emitting units 22 through the light holder fitting opening 111. Then, the light holder 2 is rotated in a direction so the multiple hook members 21 are engaged with the two elastic supporting rods 12. In this way, not only the light cover 1 with X-shaped structure can be folded and unfolded quickly, but the light holder 2 can be assembled with the light cover 1 quickly as well. The elasticity of the two elastic supporting rods 12 also helps with the fast engagement of the multiple hook members 21 of the light holder 2.

The light cover 1 with X-shaped structure of the present invention can also be used as a light reflector. When used as a light reflector, the inner surface of the main body 11 can further include a reflecting layer. The reflecting layer can be laminated or can be sewed onto the inner surface of the main body 11. Alternatively, a light reflecting material can also be coated on the inner surface of the main body 11 to form the reflecting layer. In addition, a pivot can be disposed at the intersection of the two elastic supporting rods 12 to further strengthen the structure of the light cover 1.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A light cover with X-shaped structure, comprising:
   a main body, wherein said main body is a rectangular and tent-like cloth having a light holder fitting opening at a center thereof; and
   two and only two elastic supporting rods, wherein said two elastic supporting rods are fixed along four edges of said cloth, with two ends of each elastic supporting rod being respectively fixed to two opposite edges of said four edges so that said two elastic supporting rods cross each other at the center thereof at said light holder fitting opening;
   wherein said light cover is supported by said two elastic supporting rods to form a tent-like form;
   wherein when said two elastic supporting rods are pushed in two predetermined directions respectively, said light cover is folded to form a flattened form; and
   wherein said light cover is able to return to said tent-like form from said flattened form with the elasticity of said elastic supporting rods.

2. The light cover with X-shaped structure according to claim 1, wherein four elastic supporting rod fitting pockets are formed on said main body in a symmetrical manner, and the two ends of each of said two elastic supporting rods are respectively fitted in two opposite fitting pockets of said four elastic supporting rod fitting pockets so that said two elastic supporting rods cross each other to form an X-shaped structure.

3. The light cover with X-shaped structure according to claim 1, wherein said two elastic supporting rods are made of flexible material.

4. The light cover with X-shaped structure according to claim 3, wherein a storage mechanism is disposed on a surface of said main body, and when said light cover is in said flattened form, said storage mechanism is able to tighten the two ends of each of said elastic supporting rods so that said light cover is further folded into a compact form.

5. The light cover with X-shaped structure according to claim 4, wherein when said storage mechanism is released, said light cover is able to return to said tent-like form from said compact form with the elasticity of each of said two elastic supporting rods.

6. The light cover with X-shaped structure according to claim 1, wherein said light cover is further foldable into a compact form from said flattened form, and recoverable to said tent-like form from said compact form.

7. The light cover with X-shaped structure according to claim 6, further including a storage bag for placing said light cover in said storage bag when said light cover is folded into said compact form.

8. The light cover with X-shaped structure according to claim 1, wherein said main body is a square and tent-like cloth.

9. The light cover with X-shaped structure according to claim 1, wherein an inner surface of said main body further includes a reflecting layer.

10. The light cover with X-shaped structure according to claim 9, wherein said reflecting layer is laminated or sewed onto said inner surface of said main body.

11. The light cover with X-shaped structure according to claim 9, wherein a light reflecting material is coated on said inner surface of said main body to form said reflecting layer.

\* \* \* \* \*